CONTROLS FOR WEB SPLICING APPARATUS

Original Filed April 21, 1955 8 Sheets-Sheet 1

INVENTORS.
Corson Walter Chase
Walter J. Jasinowski
Arne V. Pedersen
By: Wolfe, Hubbard, Voit & Osann
Attys.

CONTROLS FOR WEB SPLICING APPARATUS

Original Filed April 21, 1955 8 Sheets-Sheet 2

INVENTORS:
Corson Walter Chase
Walter J. Jasinowski
Arne V. Pedersen
By: Wolfe, Hubbard, Voit & Osann Attys.

INVENTORS.
Corson Walter Chase
Walter J. Jasinowski
Arne V. Pedersen
By: Wolfe, Hubbard, Voit & Osann Attys.

INVENTORS.
Corson Walter Chase
Walter J. Jasinowski
Arne V. Pedersen
By: Wolfe, Hubbard, Voit & Osann Attys.

CONTROLS FOR WEB SPLICING APPARATUS

Original Filed April 21, 1955 8 Sheets-Sheet 5

INVENTORS.
Corson Walter Chase
Walter J. Jasinowski
Arne V. Pedersen
By: Wolfe, Hubbard, Voit & Osann Attys.

Nov. 6, 1962 C. W. CHASE ETAL 3,062,466

CONTROLS FOR WEB SPLICING APPARATUS

Original Filed April 21, 1955 8 Sheets-Sheet 6

INVENTORS.
Corson Walter Chase
Walter J. Jasinowski
Arne V. Pedersen
By: Wolfe, Hubbard, Voit & Osann Attys.

INVENTORS.
Corson Walter Chase
Walter J. Jasinowski
Arne V. Pedersen
By: Wolfe, Hubbard, Voit & Osann Attys.

Nov. 6, 1962 C. W. CHASE ETAL 3,062,466

CONTROLS FOR WEB SPLICING APPARATUS

Original Filed April 21, 1955

8 Sheets-Sheet 8

INVENTORS.
Corson Walter Chase
Walter J. Jasinowski
Arne V. Pedersen
By: Wolfe, Hubbard, Voit & Osann Attys.

United States Patent Office 3,062,466

Patented Nov. 6, 1962

3,062,466

CONTROLS FOR WEB SPLICING APPARATUS

Corson Walter Chase, Oak Park, and Walter J. Jasinowski, La Grange Park, Ill., and Arne V. Pedersen, Gentofte, Denmark, assignors to Miehle-Goss-Dexter, Incorporated, Wilmington, Del., a corporation of Delaware Original application Apr. 21, 1955, Ser. No. 502,923, now Patent No. 2,963,234, dated Dec. 6, 1960. Divided and this application Sept. 29, 1960, Ser. No. 59,297

15 Claims. (Cl. 242—58.3)

This invention relates in general to web splicing apparatus and, more particularly, to the control of the cooperating movable components which act to position a new roll adjacent a running web, to predrive the new roll, to splice the new roll to the running web, and to brake the newly spliced roll while it is being moved into operative relation relative to tensioning elements or straps. This application is a division of applicants' copending application Serial No. 502,923, filed April 21, 1955, now U.S. Patent No. 2,963,234.

It is the general aim of the invention to make the operation of web splicing apparatus for effecting "flying pasters" highly reliable and perfectly safe for operating personnel, as well as to assure that any failure of the mechanism cannot result in damage thereto.

More specifically, it is an object of the invention to provide web splicing apparatus in which the movements and operations of all components are so controlled that each proceeds only in response to completion of another, so that no error can result once the splicing has begun.

Another object is to prevent rotation of the reel which supports web rolls beyond a predetermined position when the predrive carriage and belt are lowered, thus preventing the latter from being "trapped" by an advancing newly loaded roll.

It is also an object of the invention to provide fluid pressure means for moving a paster carriage between its retracted and operative positions, together with control means therefor which stop retraction of the carriage if any object is disposed in its retraction path. A related object is to provide positive locking of the paster carriage in its retracted position so that it will not be moved even though there should be a failure of fluid pressure, together with means for unlocking the carriage when it is to be lowered towards splicing position.

It is a further object to increase the safety with which the web splicing apparatus operates by a control arrangement which requires that the operator holds a switch closed until the cycle has progressed to a predetermined point, all of the components being returned to their original retracted positions if the operator, in an emergency, simply releases the switch.

Other objects and advantages will become apparent as the following description proceeds, taken in conjunction with the accompanying drawings, in which.

While the invention has been shown and is described in some detail with reference to a particular embodiment thereof, there is no intention to thus limit it to such detail. On the contrary, the intention here is to cover all modifications, alterations and equivalents falling within the spirit and scope of the invention as defined by the appended claims.

*General Organization*

Figures 1, 2:
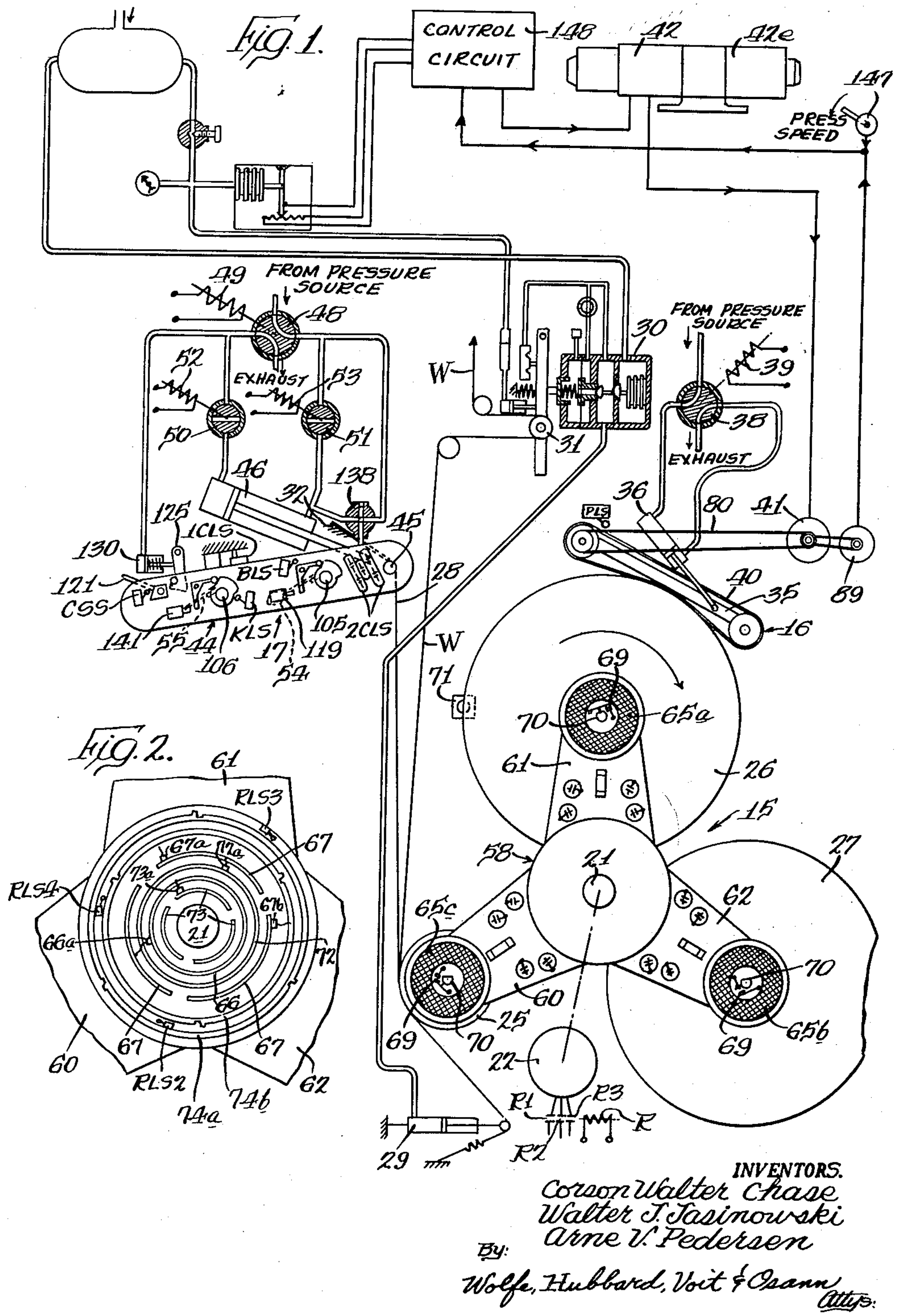
FIGURE 1 is a schematic diagram which is partially mechanical, electrical and pneumatic in form, illustrating the over-all organization of apparatus forming a preferred embodiment of the invention.
FIG. 2 is a fragmentary schematic representation of electrical components controlled according to the rotational position of the reel shaft shown in FIG. 1.

The web splicing apparatus here illustrated as embodying the invention is of the general type employed with newspaper printing presses to make "flying pasters," i.e., to splice the leading end of a new paper roll to the web being drawn from an expiring roll without requiring interruption or slowing down of the web and the press into which it is fed. The mechanism includes a movable support for paper rolls, here shown as a reel assembly 15, a predrive assembly 16 on one side and a paster carriage assembly 17 on the other side (FIGS. 1 and 2). Axially spaced on a reel shaft 21, which may be turned by a suitable electric motor 22, are spiders having radial arms which rotatably support three web rolls 25, 26, 27. The running web W is drawn from the expiring roll 25 upwardly into the press (not shown) at a speed dependent upon the press speed.

For retarding rotation of the expiring roll 25 so as to create tension in the web W, a plurality of straps 28 bear against that roll and are tightened by a pneumatic actuator 29 supplied with variable air pressure from an automatic controller 30 which is responsive to the deflection of a floating roller 31 over which the web W is trained. This tensioning system is preferably of the type disclosed and claimed in the McWhorter Patent No. 2,743,881, issued May 1, 1956, to which reference may be made for a more detailed description.

The predrive assembly 16 is mounted on the upper portions of Y-shaped supports 34 (FIG. 3) which also carry the reel shaft 21. The assembly includes a carriage 35 (FIGS. 1, 4 and 5) movable or pivotable between a retracted position (permitting clearance for a roll as the reel rotates) and an operative position (permitting the new roll to be either driven or braked). Such movement is effected by a double-acting pneumatic actuator 36 under the control of a four-way valve 38 shifted between its two positions in response to energization or deenergization of a solenoid 39. The carriage 35 supports an endless belt 40 which may thus be brought into frictional driving engagement with the new roll 26 so that the latter is brought up to speed before the splice to the running web is made. The belt 40 is driven or retarded by a motor 41 controlled in a particularly advantageous manner by means including an amplidyne 42. The carriage 35 is raised and lowered to and from its retracted and operative positions automatically to permit the newly loaded roll 27 to clear it as the reel rotates.

It will be understood that prior to a splice, the leading edge of the new roll 26 is coated with a suitable adhesive paste or glue which remains tacky. A discontinuity is left in the adhesive where the predrive belt 40 engages the roll.

The paster carriage assembly 17 (FIGS. 1, 6 and 7) functions to deflect the running web W against the properly positioned new roll 26 in order to bond the web to the leading edge of the new roll, and to sever the old web from the expiring roll 25. This assembly includes a carriage 44 pivoted to rock between retracted and operative positions about a support shaft 45 under the influence of a double-acting pressure fluid (pneumatic) actuator or ram 46 controlled by a four-way solenoid valve 48 moved between its two positions in response to energization of a solenoid 49. Also connected in the pneumatic circuit are two safety valves 50, 51 movable between their two positions in response to energization of solenoid coils 52 and 53.

Supported on the paster carriage 44 are a plurality of brushes 54 cocked against spring biasing means and retained by a latch. With the carriage lowered, release of the latch permits the brushes 54 to swing outwardly and deflect the web W against the rotating new roll 26. This, in turn, causes the web to adhere to the paste on the new roll. Also supported on the paster carriage, and actuated shortly after the brushes, are a plurality of knives 55 cocked against spring means and retained by a latch. When the latch is released, the knives swing to sever the web W at a point beneath the brushes so that the expiring roll web is broken.

*Reel Assembly*

Figure 3:
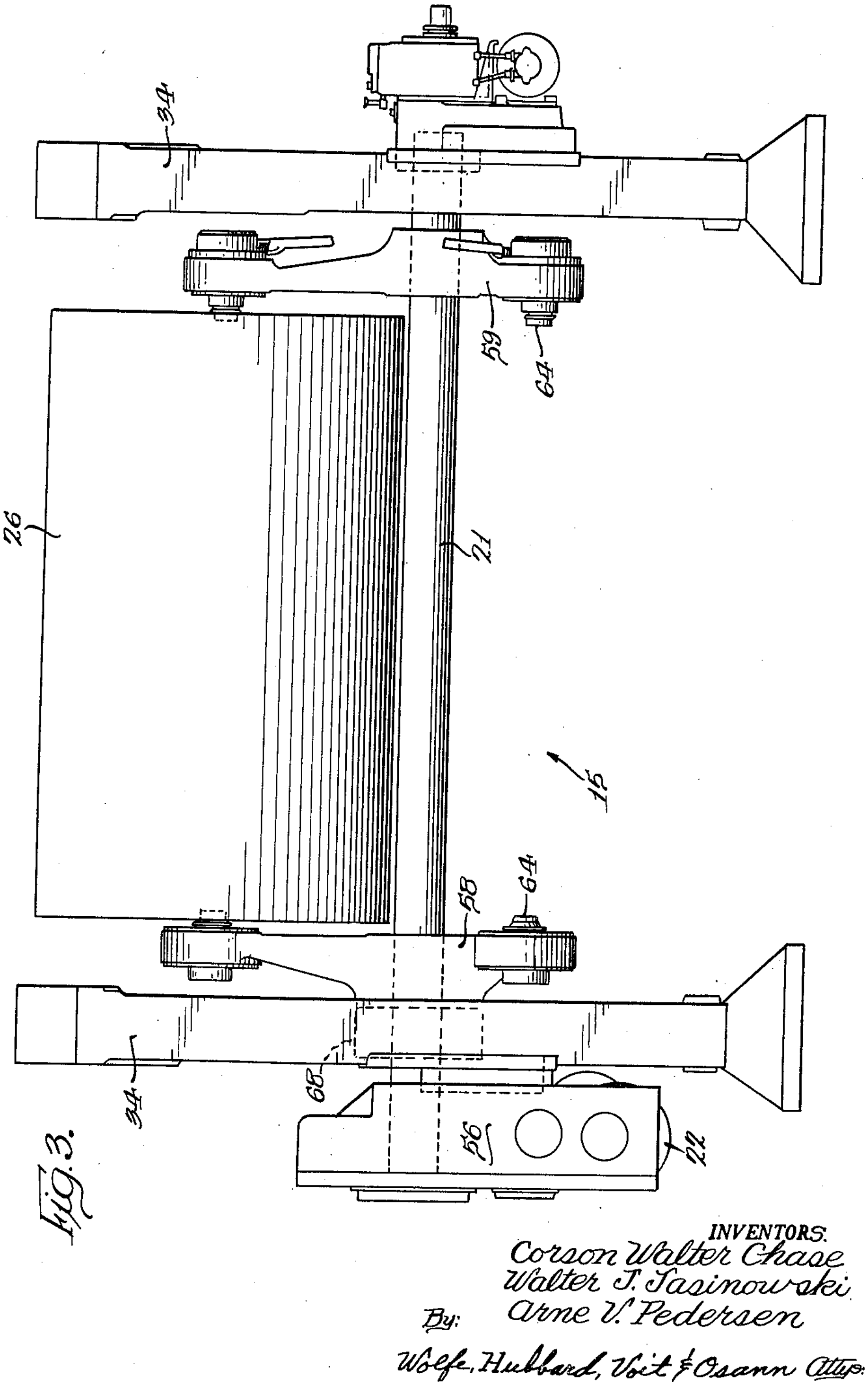
FIG. 3 is a front elevation of the reel assembly and its supports.

Referring more particularly to FIGS. 1 and 3 it will be seen that the main reel shaft 21 is rotatably held in the vertical, Y-shaped support 34. The reel motor 22 is drivingly connected through a suitable speed-reducing gear box 56 and energized through contacts R–1, R–2, and R–3 closed upon energization of a coil R to rotate the shaft 21 counterclockwise as viewed in FIG. 1.

Two spiders 58, 59 are rotatable with the shaft 21, each having three radial arms 60, 61, 62 at 120° intervals. In each radial arm are journaled spindles 64 on which the rolls are chucked. Magnetic brakes are associated with the three spindles in the spider 58, such brakes having stationary field coils 65*a*, 65*b*, 65*c* which, when energized brake the corresponding roll to prevent or retard rotation. These coils are energized through a slip ring segments 67 (FIG. 2) mounted in insulating material to rotate with the shaft 21 and enclosed by a stationary slip ring housing 68 (FIG. 3).

A stationary brush 66*a* rides on the slip ring 66, and two stationary brushes 67*a*, 67*b* engage the different segments 67 according to the angular position of the reel shaft 21. This affords control of each brake coil 65*a*, 65*b*, and 65*c* in the same manner when its spindle is in the "new roll" or the expired roll position. Also located in the arms of the spider 58 are respective breaker contacts or points 69*a*, 69*b*, 69*c* which are opened and closed by cams 70 fixed to the associated spindles. The new roll of paper is positioned on the spindles so that the correct relationship exists between the corresponding breaker points 69*a*, 69*b*, or 69*c* and the glue pattern on the trailing edge of the new roll. This assures that each cam 70 opens and closes the associated breaker points 69*a*, 69*b*, or 69*c* in properly timed relation to the angular position of the pasted leading edge as the new roll is rotated prior to a splice.

Figure 12:
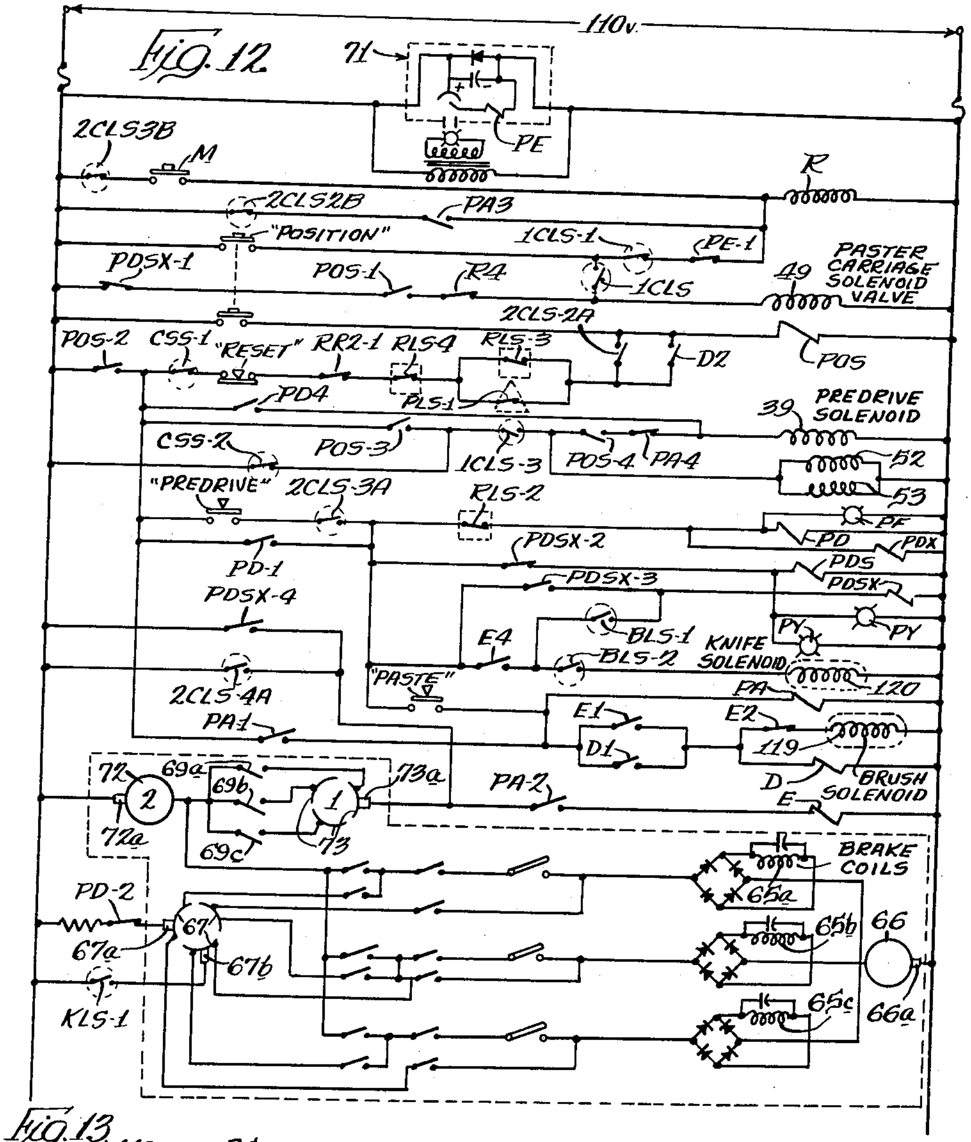
FIG. 12 is a schematic circuit diagram of the electrical controls for accomplishing sequential operation for movement of the several parts.

To make each set of breaker points control the operation of the splicing apparatus when they are in the "new roll position," they are electrically connected (see FIG. 12) to external circuits through a slip ring 72 and respective slip ring segments 73 (FIGS. 2 and 12). One stationary brush 72*a* rides on the ring 72, and one stationary brush 73*a* engages that one of the segments 73 which is uppermost, i.e., corresponds to the newly loaded roll. With the reel shaft 21 in the position shown by FIGS. 2 and 12, only the breaker points 69*a* are operative in controlling a series circuit between the brushes 72*a* and 73*a*.

To sense the angular position of the reel shaft 21, two circular cams 74*a* and 74*b* are mounted to rotate with the shaft and to control the actuation of cam switches RLS2, RLS3 and RLS4 (FIG. 2). Each cam has three rises spaced at 120° intervals, so that the four cam switches are actuated as each newly loaded roll, or expired roll, passes through predetermined angular positions, as hereinafter described.

In preparation for a splicing operation, the reel 20 is set in rotation to bring the new roll 26 to a substantially top vertical position as shown in FIG. 1. To assure that the new roll will be stopped in close proximity (about ¾ inch) to the running web W the photoelectric cell 71 of a photo relay is mounted on one of the frames 34 with a light beam source mounted on the opposite frame. When the periphery of the new roll 26 breaks the light beam, the reel driving motor 22 is automatically deenergized to halt reel rotation. The circuitry for this photoelectric control will be taken up in more detail at a later point.

*Predrive Assembly*

Figure 4:
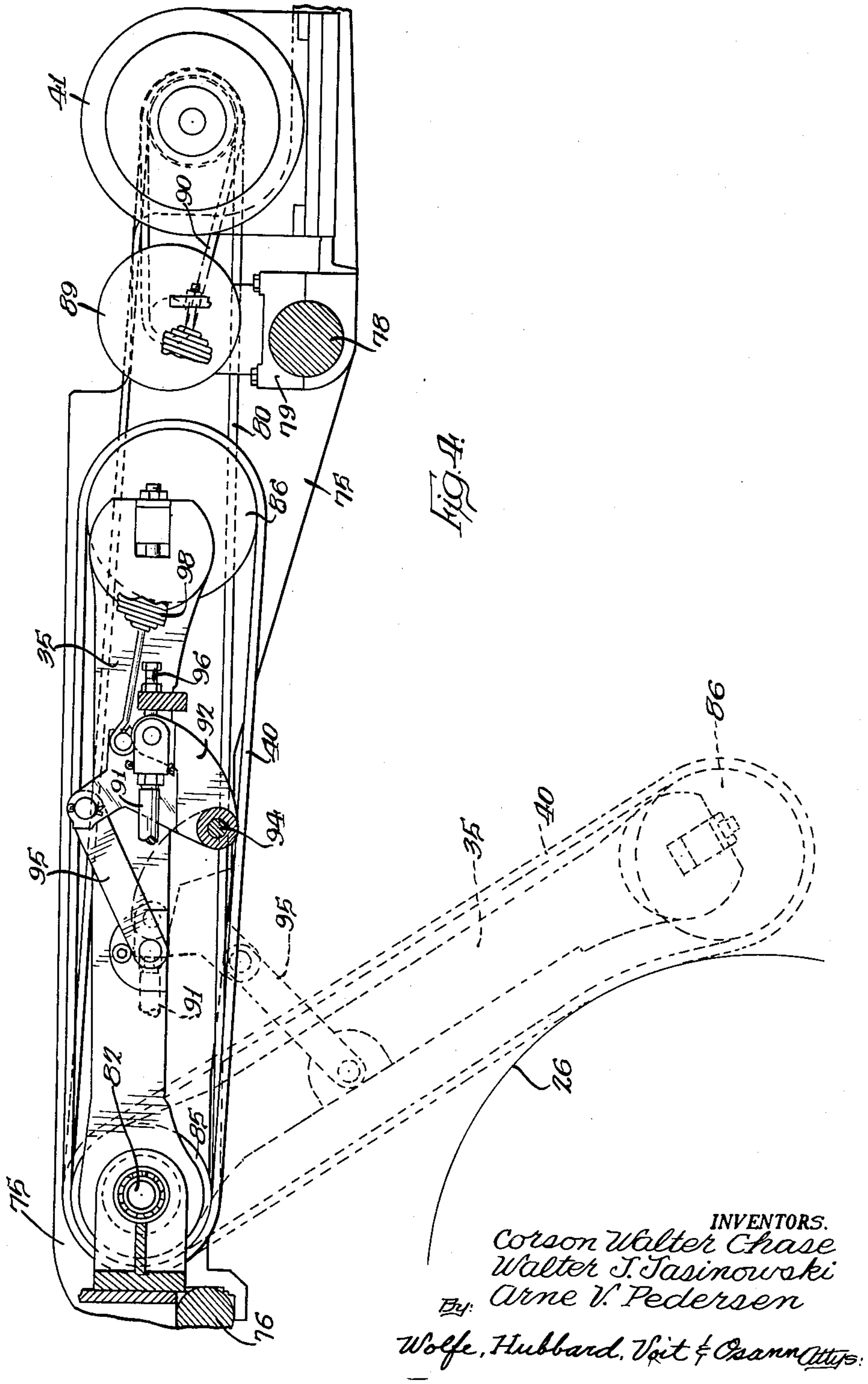
FIG. 4 is a sectional view of the predrive assembly and carriage, taken substantially along the line 4—4 in FIG. 5.
Figure 5:
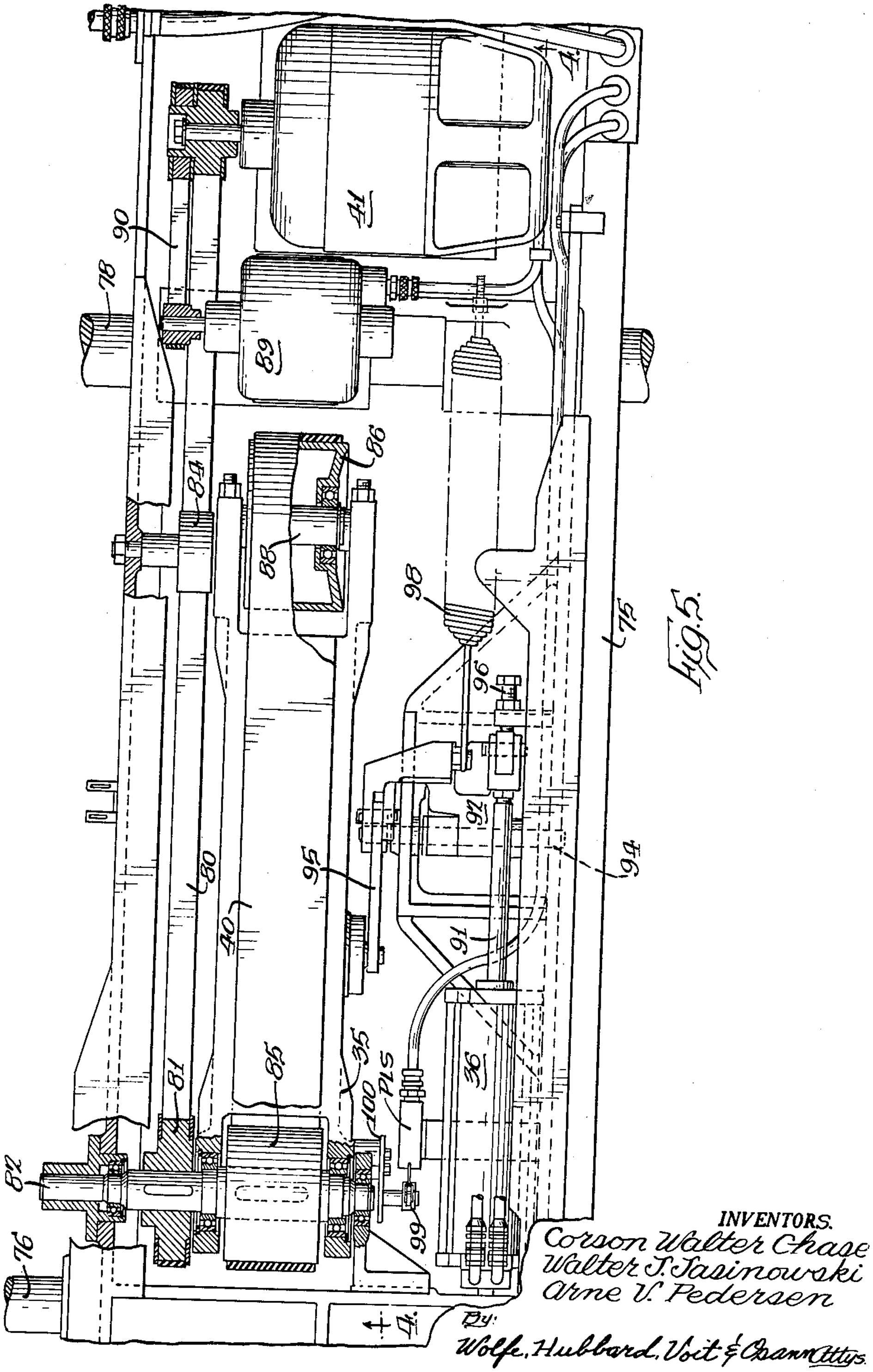
FIG. 5 is a plan view of the predrive assembly.

With more particular reference to FIGS. 1, 4 and 5, the predrive assembly includes a frame 75 which is mounted at the upper ends of the supports 34 on two cross bars 76, 78. A clamp 79 may be loosened to permit adjustment of the frame axially along the bars, thereby setting the axial location where the predrive belt engages the new roll periphery. The predrive motor 41 is mounted at one end of the frame 75 (FIG. 3), and connected by drive means such as a toothed belt 80 with a toothed pulley 81 keyed to a shaft 82 journaled by suitable bearings at the opposite end of the frame. Intermediate support for the belt is given by an idler 84. Also supported by bearings on the shaft 82 is the bifurcated end of the predrive carriage 35, a pulley 85 being keyed to the shaft between the bearings for the carriage. The predrive belt 40, in turn, is trained over the pulley 85 and a second pulley 86 journaled on a cross shaft 88 at the opposite bifurcated end of the carriage. Mounted adjacent the motor 41 is a speed sensing device, here a tachometer generator 89, which is also driven from the motor shaft by a short connecting belt 90. The tachometer gives an electrical signal or voltage proportional to the speed of the motor, and thus proportional to the peripheral speed of the new roll. The tachometer signal is employed to adjust the speed of the new roll to match that of the web prior to actual splicing.

To rock the carriage 35 and the belt 40 between their upper, retracted and their lower, operative positions, the double-acting ram 36 is suitably fastened to the frame 75 with its piston rod 91 connected to a lever 92 pivoted on a stub shaft 94. The lever, in turn, is connected by a pivoted link 95 to the belt carriage 35. As the piston rod 91 is retracted, it rocks the lever counterclockwise about the shaft 94, permitting the belt carriage 35 to descend to the operative position shown by dashed lines in FIG. 4. The upper position of the carriage 35 may be adjusted by a stop bolt 96 engaged by the extended piston rod. A tension spring 98 may be connected between the lever 92 and the frame in order to aid in returning the carriage 35 to its retracted position as the piston rod 91 is extended.

To prevent the lowered carriage from being "trapped" as the newly loaded roll advances after a splice is made, a limit switch PLS is mounted on the frame 75 with its follower riding on an eccentric cam 99 fixed by a bracket 100 (FIG. 3) to the carriage 35 to swing with the carriage about the axis of the shaft 32. The switch is thus opened only when the predrive carriage 35 is lowered from its retracted position. When the switch is open it is impossible to energize the reel motor 22, as will be more fully explained.

As explained previously with reference to FIG. 1, the double-acting ram 36 is actuated according to the setting of the four-way valve 38 under the control of the solenoid 39. When the solenoid is deenergized, the valve 38 is in that position which causes the carriage 35 to be retracted.

The predrive motor 41 and the predrive belt 40 serve two important functions. First, they drive the new roll 26 and maintain its peripheral speed substantially equal to the speed of the running web W before the splice is made. Secondly, after the splice is made, they transitionally brake or retard the new roll to create a predetermined tension in the new web before the new roll advances into engagement with the tension belts 30.

*Paster Carriage Assembly*

In physical structure the paster carriage has two side frames 101, 102 (FIGS. 6 and 7) held fast at their one end on the support shaft 45 journaled between the supports 34. The shaft is rocked to raise or lower the frames 101, 102 by the double-acting air ram 46 which has its cylinder fast on one support 34 and its piston rod connected to a radius arm 104 fixed at one end of the shaft. Rotatably extending between the side frames 101, 102 are a brush shaft 105, a knife shaft 106 and a safety shaft 108.

Figure 6:
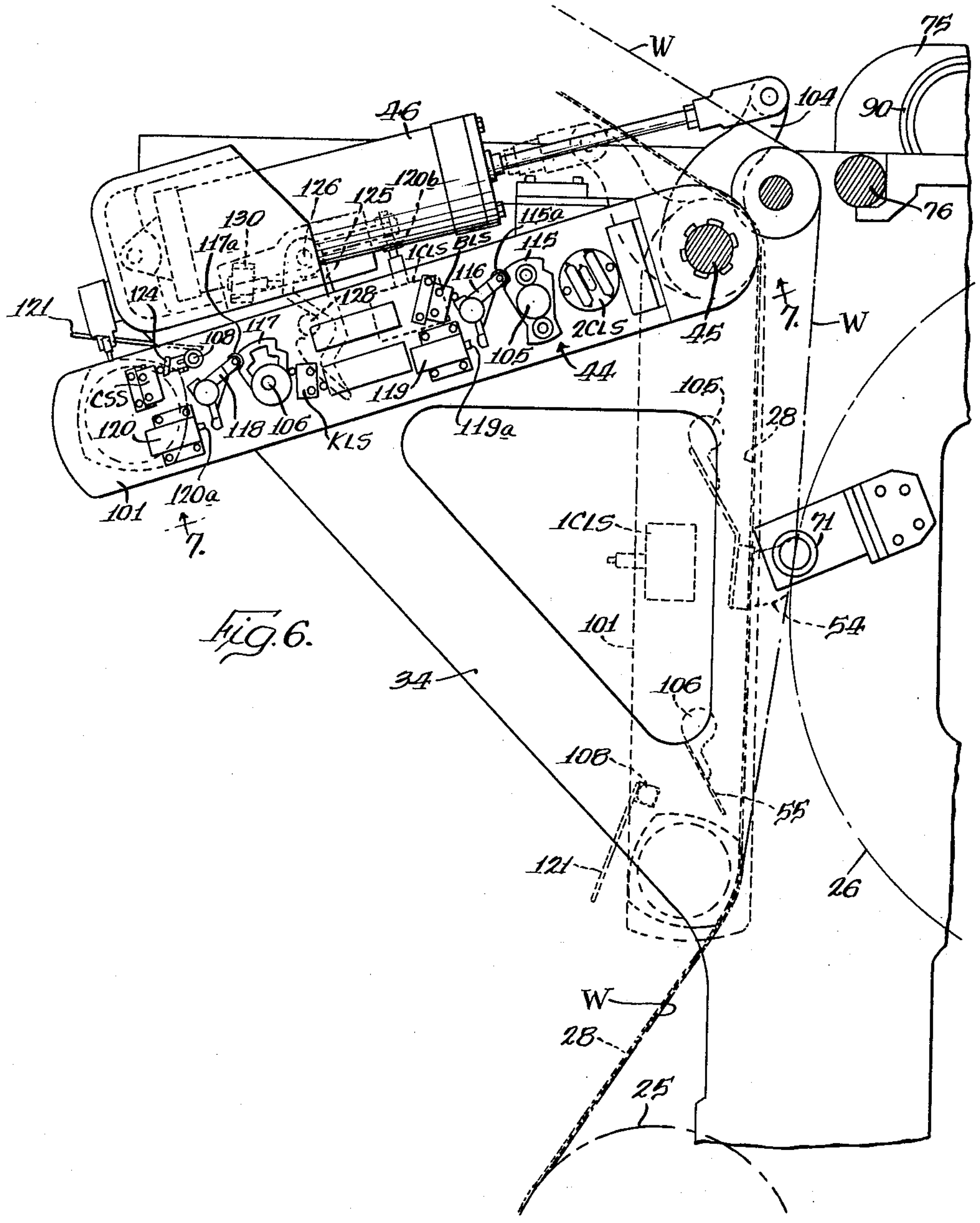
FIG. 6 is a side elevation of the paster carriage assembly.
Figure 7:
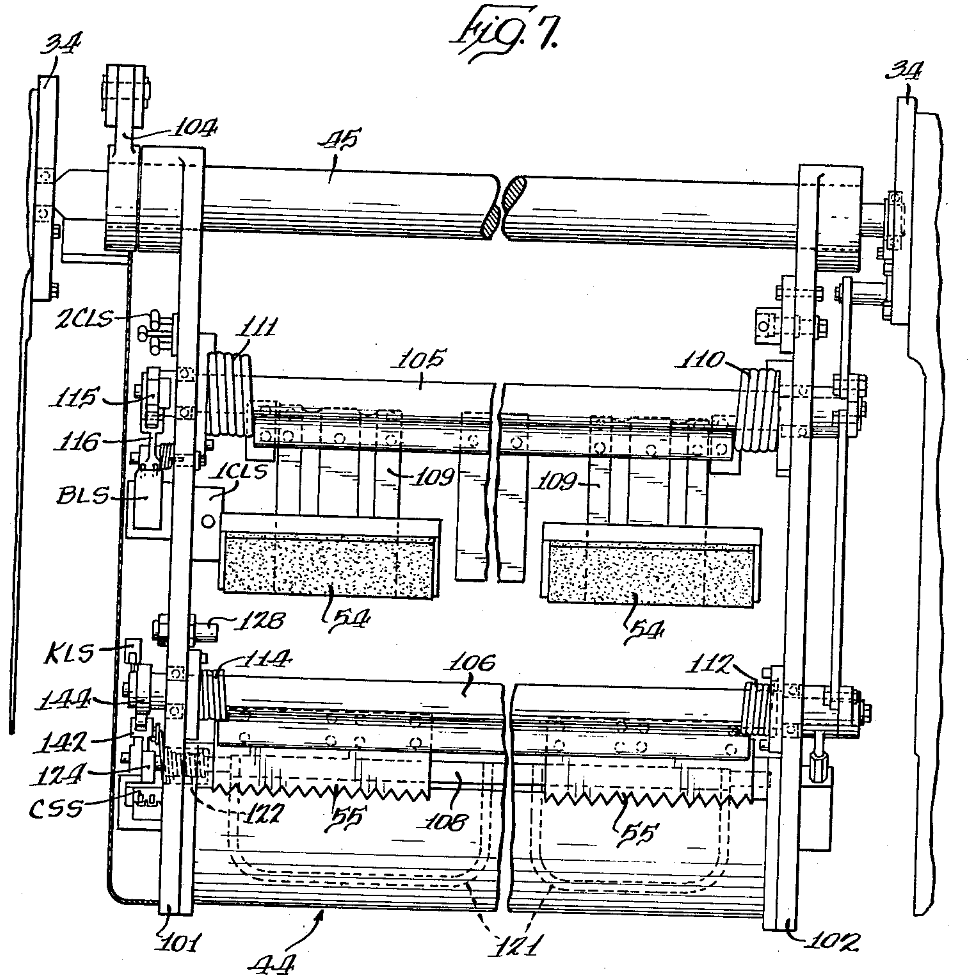
FIG. 7 is a bottom view of the paster carriage looking substantially along the line 7—7 in FIG. 5.

Referring to FIG. 7, a plurality of the brushes 54 are held axially spaced on the shaft 105 by brackets 109 which are bolted directly to the flat surface of a protruding lip which is a part of the brush shaft 105. For biasing the brush and knife shafts 105 and 106 in a clockwise direction (as viewed in FIG. 6), each is equipped with torsion springs 110, 111 and 112, 114, respectively (FIG. 7). These springs are cocked by clockwise rotation of the shafts 105 and 106 as an incident to retraction of the carriage to its upper position. The cocking means are not here shown, but reference may be made to the above-identified copending parent application for their details. It will suffice to observe that after cocking the brush shaft 105 is held against clockwise rotation by a latch cam 115 engaged by a latch member 115*a* carried on a bell crank 116. Similarly, the cocked knife shaft 106 is held against clockwise rotation by a cam plate 117 fixed thereto and engaged with a latch member 117*a* forming part of a bell crank 118.

The brush shaft 105 is released from the cocked position upon the bell crank 116 being tripped when its opposite arm is struck by the plunger 119*a* of a solenoid 119 when the latter is energized (see FIGS. 6 and 7). The knife shaft 106 is similarly released in response to energization of a solenoid 120, its plunger 120*a* rocking the bell crank 118 to move the latch 117*a* clear of the cam 117. The manner in which the solenoids 119, 120 are energized will be more fully explained below.

Mounted on the frame member 101 are two carriage limit switches 1CLS and 2CLS which are used for control purposes as explained below. The switch 2CLS is gravity-operated whenever the paster carriage approaches its lowered operative position. For this purpose, the switch 2CLS, which has a plurality of contacts, may include mercury bottles mounted in suitable angularly adjustable spring clips. The carriage limit switch 1CLS is depressed by a stop pin 120*b* whenever the carriage is fully retracted. This will be considered the normal or de-actuated condition of the switch, its contacts being actuated when the carriage is lowered.

In accordance with one feature of the present invention, the retraction of the paster carriage from its lowered position is so controlled that it cannot trap an object, for example, a man which might be standing in the way. To this end, the safety shaft 108 carries a plurality of rearwardly extending safety deflectors 121 which project beyond the rear surfaces of the frame members. The shaft 108 and the radially extending deflectors 121 are urged clockwise as shown in FIG. 6 by a suitable torsion spring 122 (FIG. 7). Mounted fast on the shaft 108 at the outer surface of the frame 101 is a camming arm 124 (FIG. 6) engaged by the follower of a carriage safety switch CSS. This switch is, therefore, actuated whenever the deflectors 121 strike an object as the carriage retracts and thus rock the shaft 108 clockwise as viewed in FIG. 6. The contacts for the safety switch CSS are connected into the over-all safety control circuit as explained more fully below.

In keeping with another safety feature of the invention, the paster carriage is held in its retracted position even though there should be a failure in the supply of fluid pressure to the double-acting ram 46. For this purpose, a safety latch hook 125 is pivoted at 126 to the support 34 (FIG. 6) and disposed beneath a latch pin 128 fixed in the frame 101. As the carriage retracts, the pin 128 strikes a curved surface on the latch hook 125, rocking the latter clockwise, against a compression spring 129 (FIG. 8), until it falls beneath the pin. For moving the latch hook 125 when the carriage is to be lowered, a fluid pressure actuator or cylinder 130 is disposed such that its piston rod, working against the compression spring 129, strikes the latch hook and rocks it counterclockwise.

The incorporation of the latch controlling cylinder 130 into the pneumatic controls for the ram 46 and the organization of these controls will become clear upon reference to schematic FIGS. 8–11. The four-way two-position valve 48, controlled by energization of the solenoid 49, receives air pressure through an inlet 131 and may exhaust air through an outlet 132. This valve is also connected through lines 134 and 135, and through the respective two-way safety valves 50 and 51 to the opposite sides of a piston 47 in the actuator 46. The safety cylinder 130 is connected by a line 136 to the line 134 so that it receives air pressure whenever the valve 48 is actuated by energization of solenoid 49. Connected in parallel with the safety valve 51, i.e., from the line 135 to the right side of the actuator 55 is a bleeder valve 138 having a spring biased plunger 139 which is shifted by the carriage when the latter is fully retracted. Such shifting of the plunger 139 opens a small bleed port 140 to permit slow transfer of air through the valve.

Figure 8:
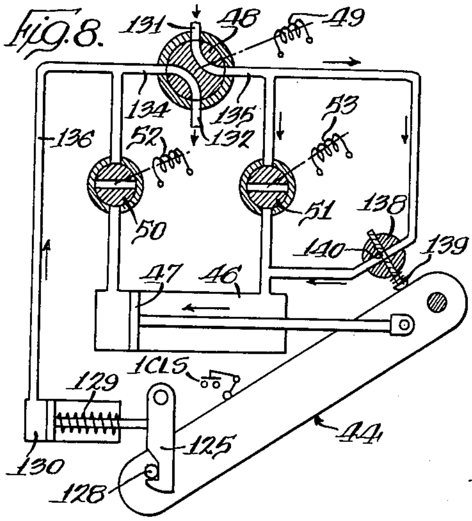
FIGS. 8–11 are schematic illustrations of the fluid pressure means and controls for moving the paster carriage between retracted and inoperative positions.

FIG. 8 illustrates the condition of this pneumatic circuit when the carriage is retracted and locked safely by the latch hook 125. The solenoids 52, 53 are deenergized so that the safety valves 50 and 51 are closed. The solenoid 49 is also deenergized, the valve 48 venting the line 134 to the atmosphere, and supplying the line 135 with air pressure through the inlet 131. This pressure is maintained on the right side of the piston 47 through the bleed port 140. The cylinder 130 being exhausted, its piston and piston rod retreat to the left under the influence of the compression spring 129, so that the hook 125 embraces but does not engage the pin 128. If the air pressure supply should fail and the carriage 44 starts to drop it will move slowly due to the throttling action of the bleeder valve 138, but the hook 125 will engage the pin 128 and thus hold the carriage up.

Figure 9:
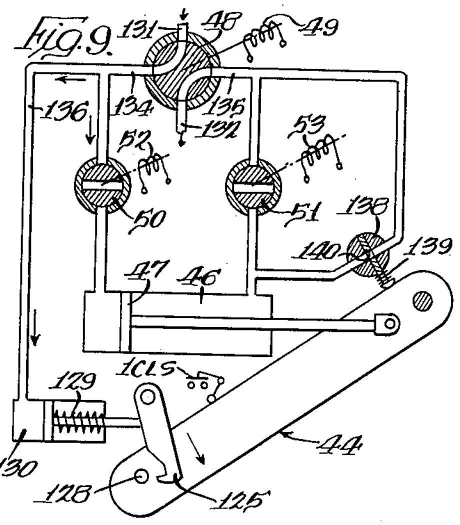

When the carriage is to be lowered the solenoid 49 is energized so that the valve 48 moves to its opposite position as shown in FIG. 9. Air pressure is thus supplied to the safety cylinder 130, moving its piston to the right and rocking the safety hook 125 clear of the pin 128. At the same time, the line 135 is vented to the atmosphere so that air on the right side of the piston 47 may bleed through the valve 138, letting the carriage drop slowly under the influence of gravity.

Figure 10:
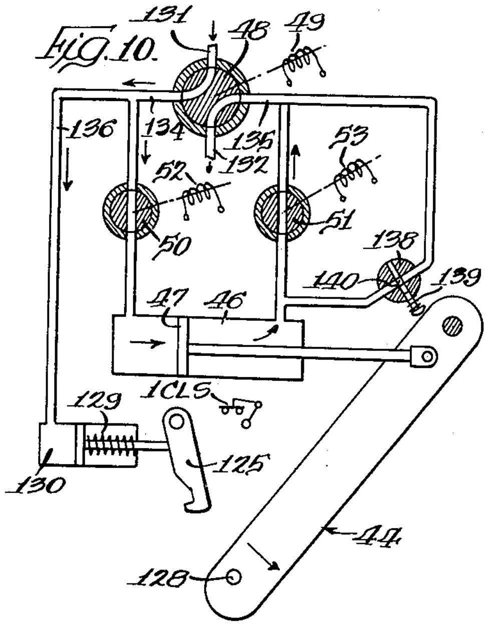

When the carriage has descended a predetermined amount, the limit switch 1CLS is actuated. This, as explained below, results in the energization of the solenoids 52 and 53 for the safety valves 50 and 57. Since these safety valves are thus opened, as shown in FIG. 10, the right side of the piston 47 is exhausted to the atmosphere and its left side supplied with air pressure. The actuator 46 thus rocks the carriage to its lowered position, the plunger 139 moving outwardly to close the bleed port 140.

To raise the paster carriage from its lowered position it is only necessary to deenergize the solenoid 49 for the valve 48. This valve then returns to the position shown in FIG. 8 while the safety valves 50, 51 remain open. The left side of the piston 47 is vented and its right side supplied with air pressure. Once the carriage has retracted sufficiently to cause de-actuation of the limit switch 1CLS, then the safety valves 50, 51 reclose to return the system to the condition shown by FIG. 8.

Figure 11:
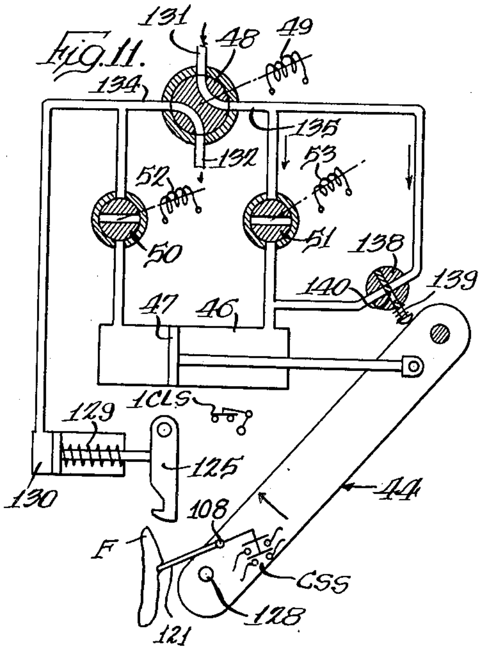

FIG. 11 illustrates the operation of the pneumatic controls if a foreign object F should be disposed in the path of the carriage as it is retracted. The safety deflectors 121 strike the object F, thus rocking the safety shaft 108 and actuating the carriage safety switch CSS. Even though the limit switch 1CLS is actuated at this time, the actuation of the switch CSS, as described more fully below, results in the deenergization of the solenoids 52, 53 for the two safety valves 50, 51. These valves thus close at once, completely trapping air on either side of the piston 47. The bleeder valve 138 is also closed at this time. Therefore, the piston 47 and the carriage 44 are halted. They cannot be moved upwardly until the foreign object is removed and the safety deflectors 121 are released. Any object thus disposed in the retracting path of the carriage cannot be crushed, nor can it cause damage to the carriage itself.

*Operation of Safety Controls*

The operation of the safety controls may be best understood by following through a typical sequence of operations with reference to the schematic diagram of the electrical control circuit in FIG. 12. The various relay coils are identified by the same alphabetical symbols used to identify their various contacts, the latter having distinguishing numerical suffixes. Various limit switches and mercury switches identified above are marked in FIG. 12 with the same reference characters previously employed.

Those particular limit switches or other components mounted in the reel assembly are enclosed by dashed rectangles in FIG. 12 for ease of identification. In a similar manner, those electrical components on the paster carriage are shown in FIG. 12 enclosed in dashed circles for convenience, while those on the predrive train are enclosed in dashed triangles. All switch and relay contacts are shown open or closed, as the case may be, as they are when the predrive carriage and paster carriage are both retracted prior to the beginning of an operational cycle.

Figure 13:
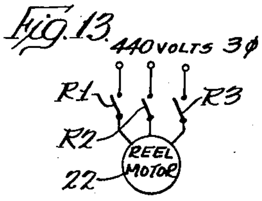
FIGS. 13 and 14 are schematic diagrams of auxiliary circuits.

Any time that a paste or splicing cycle is not in progress, the contactor coil R may be energized by depressing a manual push button switch M (FIG. 12), thus closing the contacts R–1, R–2, R–3 and energizing the reel motor 22 (FIGS. 1 and 13). At all times that a paper roll does not interrupt the light beam shining into the photoelectric relay 71, its coil PE is energized and the contacts PE–1 are closed.

To initiate the splicing operation, an operator depresses and holds a "position" push button switch, thus energizing the contactor coil R through normally closed contacts 1CLS–1 and PE–1. The reel, therefore, begins rotating in a counterclockwise direction, advancing the new roll 26 (FIG. 1) toward its pre-paste position. The lower contact for the "position" button energizes the coil of a relay POS so that it is picked up. The solenoid 49 for the paster carriage control 48 is not, however, energized because the contacts R–4 are at this time open. The operator must hold the "position" switch down until the periphery of the new roll 26 breaks the light beam, thereby deenergizing the coil PE and opening the contacts PE–1. This, in turn, deenergizes the coil R and the motor 22 to halt the reel with the new roll closely spaced to the running web W.

When the contactor R drops out, its contacts R–4 reclose, thereby energizing the solenoid 49 for the paster carriage four-way valve 48. As explained previously, the paster carriage thus begins to descend under the influence of gravity by bleed through the valve 138 (giving the latch hook 125 time to swing clear) until the limit switch 1CLS is actuated. As this ocurs, contacts 1CLS–3 close to energize the solenoids 52, 53 for the safety valves 50, 51 through the now closed POS–2 and POS–3 contacts. Closure of the contacts 1CLS–3 also energizes the solenoid 39 for the four-way valve 38, controlling the predrive carriage 35. As a result, the predrive carriage 35 and the paster carriage both begin to descend toward their operative positions under the influence of their respective fluid pressure actuators 36 and 46. The predrive belt 40 thus rests on the surface of the new roll 26 and the paster carriage assumes a substantially vertical position adjacent the opposite side of the running web W.

As the paster carriage approaches its lowered or operative position, the mercury limit switch 2CLS is actuated. Upon closure of the normally open contacts 2CLS–2A, the coil for the POS relay is sealed in through the line which contains the normally closed CSS–1 contacts, a "reset" push button switch, RR2–1 contacts, RLS–4 contacts and RLS–3 contacts in parallel with PLS–1 contacts. The contacts 2CLS–3A close to prepare a circuit including a normally open "predrive" push button switch. Also, the contacts 2CLS–3B open to render inoperative the manual push button switch M.

The operator may now release the "position" switch since the relay POS is sealed in. Prior to the actuation of the carriage limit switch 2CLS, if the "position" button had been released, the predrive and paster carriages would have returned to their original positions. Therefore, if anything goes wrong during this initial stage of the operational sequence, the operator need only release the "position" button in order to restore the apparatus to its original condition, i.e., to make both carriages return to the retracted positions.

After the new roll 26 is in its pre-paste position, the operator momentarily presses and closes the "predrive" switch, thus completing a circuit through the now closed contacts 2CLS–3*a* and the normally closed contacts RLS–2 for the coil of a relay PD. A second relay PDX connected in parallel with the coil PD through normally closed contacts RLS–1, is also energized. These are sealed in through the POS–2 contacts by closure of contacts PD–1. Simultaneously, another auxiliary relay PDS is energized through normally closed contacts PDSX–2 and sealed in through the contacts PD–1.

Energization of the coil PD opens contacts PD–2 in series through which power is furnished to brake coil for the individual spindle upon which the new roll is mounted. This prepares the new roll to be pre-driven prior to splicing.

Figure 14:
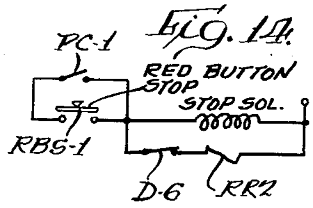

At this point, it may be observed that the printing press into which the web W is being drawn has several controls for its drive motors. Because the drive motors are conventional, they are not here shown in detail, and it will suffice to note simply that the press can be quickly stopped in response to actuation of an emergency or "red button" switch (FIG. 14) and the resultant energization of a "stop" solenoid. The press controls further include contacts PC–1 which are closed in response to energization of the "stop" solenoid and which remain closed until the press is completely stopped.

It is to be noted that if the "red button" stop switch in FIG. 6 is closed at any time during the foregoing operations, an auxiliary relay RR2 is energized through the contacts PC–1 and normally closed contacts D–6, and its contacts RR2–1 open, thereby unsealing the POS relay. Opening of the POS–2 contacts would deenergize all of the solenoids and relay coils so that the predrive and paster carriages would return to their retracted positions. Emergency stoppage of the press thus prevents completion of the splicing operational cycle and restores the apparatus to its previous condition.

After the predrive carriage has been lowered and the "predrive" button depressed to pick up the relay PD, the predrive motor 41 (FIG. 1) will be energized to cause the belt 40 to drive the new roll. The signal from the tachometer 89 is compared with the signal from a second tachometer 147 which is driven from the press at a speed proportioned to the linear velocity of the running web W. The error signal is accepted by a control circuit 148 which governs the amplidyne 42, the latter supplying energizing voltage and current to the motor 41 so as to automatically make the peripheral speed of the new roll substantially equal to the speed of the web W. This is termed the "predriving" operation. The details of the predriving controls have not been shown in the present case, but a full understanding thereof may be gained by reference to the abovementioned copending patent application.

When the surface speed of the new roll 26 and the speed of the web W are in agreement, the operator may depress the "paste" push button switch (FIG. 12). As a result, the coil for an auxiliary relay PA is energized and sealed in through its own normally open contacts PA–1 and the already closed contacts POS–2. The contacts PA–2 close so that the coil of another relay E is energized the next time that the cam 70 (FIG. 1) on the new roll spindle 64 closes its breaker points 69*a*. The contacts PA–3 close so that a circuit to the contactor coil R will automatically be completed when the contacts 2CLS–2B reclose as the paster carriage retracts. Additionally, the resultant opening of the contacts PA–4 leaves the energization of the solenoid 39 for the predrive control valve energized solely through the contacts POS–2 and PD–4.

When the breaker points 69*a* for the new roll (those which are uppermost in FIG. 12) close, the relay E will be momentarily picked up. Its contacts E1 will close so that a relay D is energized, its contacts D1 closing to create a sealing circuit. The brush solenoid 119 is not energized so long as the relay E is energized and its contacts E2 are open. It should be noted that when the relay D picks up, the contacts D–6 in FIG. 14 open, so that the relay RR2 cannot be energized even if the "red button stop" switch is depressed. This arrangement thus prevents opening of contacts RR2–1 on emergency stops, and prevents termination of the splicing operations, if the splicing cycle has proceeded sufficiently that it will be completed during the time interval required for the press and web W to come to a complete stop.

As the new roll rotates further so that the corresponding breaker points 69*a* reopen, the coil E is deenergized. With this, the contacts E–2 reclose and supply current to the brush release solenoid 119 through the now closed contacts D–1. As a result, the bell crank 116 (FIG. 6) is rocked clear of the latch cam 115, and the brushes 54 are released to deflect the running web W and hold it against the surface of the new roll 26. At this time, the adhesive strip on the new roll has just passed the point of web contact, so that it adheres to the web after the new roll makes approximately one revolution.

With the release of the brush shaft 105, a limit switch BLS is actuated by the bell crank 115 (FIG. 6). Its contacts BLS–1 and BLS–2 (FIG. 12) close so that the coil of an auxiliary relay PDSX and the knife solenoid 120 will be energized the next time that the contacts E–4 close.

Then, upon continued rotations of the new roll spindle, its breaker points 69*a* reclose to reenergize the coil for relay E. The contacts E–4 close and energize the knife solenoid 120 which rocks the bell crank 118 (FIG. 6) free of the latch cam 117 so that the knives spring into the old web beneath the splice and sever it from the expiring roll. Closure of the contacts E–4 also energizes the coil PDSX which is sealed in through its contacts PDSX–3. The PDSX–1 contacts open to deenergize the solenoid 49 for the paster carriage control valve 70, so that the paster carriage immediately begins to retract. Moreover, when the knives are released to sever the web, a cam 155 on the knife shaft 106 (FIG. 6) actuates an adjacent knife limit switch KLS. The contacts KLS–1 of the latter (FIG. 12) close to complete a circuit through the brush 67*b* (and other switches which, for the present case need not be described in detail) to energize the brake coil 65*c*, thus quickly stopping the expired roll.

As the paster carriage retracts slightly, the limit switch 2CLS de-actuates, thereby reclosing its contacts 2CLS–2B which then energize the contactor coil R through the now closed contacts PA–3. As a result, the motor 22 is energized and the reel rotates to advance the new roll toward the tension straps 30 (FIG. 1). It will be noted that even though the contacts 2CLS–2A reopen, the POS coil remains sealed in through the now closed contacts D–2.

Also, as the paster carriage retracts lightly, the contacts 2CLS–4*a* reclose to establish an alternate seal-in circuit for the coil E, holding the latter energized even when the contacts PDSX–4 subsequently open.

Should any foreign object, such for example, as a workman, be disposed in the retraction path of the paster carriage, it will be struck by and pivot the safety deflector 121, thus actuating the switch CSS. The contacts CSS–1 (FIG. 12) open to drop out the POS relay which, in turn, opens its contacts POS–1 to drop out the contactor R. Reel rotation thus stops. The POS–2 contacts open to deenergize the safety solenoids 52, 53, closing the safety valves 50, 51 and trapping fluid in the cylinder 46 to halt carriage retraction. The foreign object may be freed from the deflector by closing the "position" switch which picks up the POS relay and energizes the solenoids 49, 52 and 53 so that the predrive carriage is lowered.

When the paster carriage reaches its substantially fully retracted position, the limit switch 1CLS de-actuates. Its contacts 1CLS–3 open to deenergize the safety solenoids 52, 53 so that the corresponding safety valves 50 and 51 reclose to trap the paster carriage in its retracted position. The latch hook 125 is automatically retracted beneath the pin 128 as shown in FIG. 8.

As the reel continues to rotate, the reel limit switch RLS–2 next is opened by its cam 74*b* (FIG. 2) when the new roll is in good contact with the straps 30.

The contacts RLS–2 deenergize the relay coil PD. Drop-out of this relay opens the contacts PD–4, deenergizing the solenoid 39 for the valve 38 so that the predrive carriage begins to retract. When the predrive carriage is fully retracted, the contacts PLS–1 which were open, reclose. Drop-out of the contacts PD–1 deenergizes the knife solenoid and the relay PDSX.

As the reel rotates still further, the reel limit switch RLS–3 next is opened by its cam 74*a* (FIG. 2). However, if the contacts PLS–1 have not at this time reclosed, the POS coil is deenergized, opening the contacts POS–2 to thereby deenergize the coil PA which, in turn, opens the contacts PA–3 to drop out the contactor R and stop reel rotation. By this safety feature, therefore, the predrive carriage must be fully retracted by the time the reel rotates sufficiently to open the switch RLS–3; otherwise, the reel is halted. It is thus impossible for the newly loaded roll to strike the predrive carriage as the reel advances, with possible damage to the apparatus.

Finally, as the newly spliced roll reaches a normal operating position in the straps 30, the reel limit switch RLS–4 is opened by its cam 74*b* (FIG. 2). The holding circuit for the coil POS is then broken, its contacts POS–2 open and all solenoids and relay coils are deenergized. The paste cycle is thus complete with the running web W being drawn from the new roll, with the expired roll in position for removal and replacement by a newly loaded roll, and with the previously newly loaded roll ready to advance into the pre-paste position when the next splice is to be made.

It will be noted from the foregoing description that the paste cycle may be interrupted at any time prior to seal-in of the POS relay by simply releasing the "position" push button switch. After the POS relay is sealed in, the cycle may be interrupted by depressing the normally closed "reset" push button. The actuation of the reset button unseals the POS relay to deenergize all electrical components, returning the paster carriage and predrive carriage to their retracted positions and deenergizing the predrive motor 59.

With the foregoing description of the organization and controlled operation of the improved web splicing apparatus, it will be apparent that the apparatus embodying the invention not only is substantially fully automatic but is also self-protecting and operates to produce smooth web splicing with minimum chances of web breakage.

We claim as our invention:

1. In apparatus for splicing a running web to a new web roll, the combination of a rotatable reel for supporting an expiring roll, a new roll, and a newly loaded roll, a predrive carriage pivoted for movement between a retracted position and an operative position in peripheral engagement with the new roll when the latter is in a predetermined pre-paste position, means for rotating the reel to move the new roll away from said carriage after the splice is made, means for retracting said carriage in response to such rotation of the reel, a first limit switch closed when the carriage is retracted, a second limit switch opened when the reel has moved the new roll through a predetermined angle from its pre-paste position, and control means for terminating reel rotation if both of said switches are open, whereby the carriage cannot be struck by a newly loaded roll.

2. In apparatus for splicing a running web to a new web roll, the combination of a rotatable reel for supporting an expiring roll, a new roll, and a newly loaded roll, a predrive carriage pivoted for movement between a retracted position and an operative position in peripheral engagement with the new roll, means for rotating the reel to move the new roll away from said carriage after the splice is made, a first limit switch closed only when the carriage is in its retracted position, a second limit switch opened when the reel has rotated a predetermined amount after the splice is made, and control means for terminating reel rotation if both of said switches are open.

3. In apparatus for splicing a running web to a new web roll, the combination of a rotatable reel for supporting an expiring roll, a new roll, and a newly loaded roll, a predrive carriage pivoted for movement between a retracted position and an operative position in peripheral engagement with the new roll, means on said predrive carriage for rotating the new roll before the splice is made, means for rotating the reel to move the new roll away from said carriage after the splice is made, means responsive to such rotation to retract said carriage, a first control element and means for actuating said element when the carriage is displaced from its fully retracted position, a second control element and means for actuating said element when the reel has rotated through a predetermined angle after the splice is made, and control means for terminating reel rotation if both of said control elements are actuated.

4. In web splicing apparatus, the combination comprising a paster carriage pivoted for movement between retracted and lowered positions, a double-acting pressure fluid actuator for retracting and lowering said carriage, a self-positioning latch for holding said carriage retracted in the absence of fluid pressure, a four-way valve for controlling said double-acting actuator, a pair of conduits, with a solenoid operated safety valve in each, connected between said four-way valve and said double-acting actuator, an auxiliary actuator connected to receive fluid pressure from said four-way valve when the latter is in its carriage-lowering position and operative to release said latch, a bleeder valve normally spring biased to a closed position and connected in parallel with that safety valve through which fluid is exhausted as the carriage lowers, means engaged by said carriage for opening said bleeder valve until the carriage is lowered through a predetermined angle so that the carriage initially drops under gravity forces when said four-way valve is in its carriage-lowering position, a first switch mounted for actuation in response to the carriage reaching said predetermined angle, means connecting said switch when actuated to energize said solenoids and open said safety valves so that said carriage proceeds to lower by action of said double-acting actuator, a deflectable member on the upper side of said carriage and a second switch actuated upon deflection thereof as the carriage retracts, and means connecting said switch when actuated to denergize and close said safety valves and halt carriage retraction.

5. In web splicing apparatus, the combination comprising a paster carriage pivoted for movement between retracted and lowered positions, a double-acting pressure fluid actuator for retracting and lowering said carriage, a self-positioning latch underlying and effective to hold said carriage retracted in the absence of fluid pressure, a four-way valve for controlling said double-acting actuator, a pair of conduits, with a normally closed safety valve in each, connected between said four-way valve and said double-acting actuator, an auxiliary actuator connected to receive fluid pressure from said four-way valve when the latter is in its carriage-lowering position and operative to release said latch, a normally closed bleeder valve and connected in parallel with that safety valve through which fluid is exhausted as the carriage lowers, means for opening said bleeder valve when the carriage is within a predetermined angle of said retracted position so that the carriage initially drops under gravity forces when said four-way valve is in its carriage-lowering position, first control means operative in response to the carriage reaching said predetermined angle to open said safety valves, a deflectable member on the upper side of said carriage, and second control means responsive to deflection of said member to close said safety valves and halt carriage retraction.

6. In apparatus for splicing a vertically running web to an adjacent new web roll, the combination comprising a paster carriage pivotable between a substantially vertical position adjacent the running web and a retracted substantially horizontal position remote from the web, a double-acting fluid pressure actuator for rocking said carriage between said two positions, a four-way valve for controlling the admission and exhaustion of pressure fluid to and from said actuator, two conduits, and a pair of normally closed safety valves interposed respectively therein, connecting said four-way valve and said actuator, control means for opening said safety valves when the carriage is beyond a predetermined angle below said fully retracted position, a normally closed bleeder valve connected in parallel with that safety valve which when open vents pressure fluid as the carriage is lowered, and means on the carriage for moving and opening said bleeder valve when the carriage is within said predetermined angle from said fully retracted position, whereby controlled descent of the carriage under gravitational forces occurs by bleeding of fluid through said bleeder valve before said safety valves are opened.

7. In apparatus for splicing a running web to an adjacent new web roll, the combination comprising a paster carriage pivotable between an operative position adjacent the running web and a retracted position remote from the web, a main fluid pressure actuator for rocking said carriage between its two positions, a valve for controlling the admission and exhaustion of pressure fluid to and from said actuator, a self-positioning latch for holding said carriage in its retracted position in the absence of pressure fluid in said actuator, and an auxiliary pressure fluid actuator connected to receive pressure fluid when it is supplied to said main actuator in lowering the carriage, said auxiliary actuator being linked to said latch to release the latter.

8. In an apparatus for splicing a running web to an adjacent rotating new web roll, the combination comprising a paster carriage movable between a remote position and a position adjacent the running web, a double-acting pneumatic actuator for moving said carriage between its two positions, a four-way solenoid valve operated by a solenoid for controlling the admission and exhaustion of pressure air to and from said actuator, a pair of normally closed safety solenoid valves connected between said four-way valve and said actuator, a deflectable member on said carriage remote from the web, means for energizing the solenoids of said safety valves, operated by solenoids, when the carriage is being moved by said actuator, and switch means connected in circuit with said solenoid valves and actuated upon deflection of said member for deenergizing the solenoids of and closing said safety valves to thus trap air in the actuator and stop carriage retraction.

9. In an apparatus for splicing a running web to an adjacent rotating new web roll, the combination comprising a paster carriage movable between a retracted position and a position adjacent the running web, a fluid pressure actuator for moving said carriage between its two positions, a main valve for controlling the admission and exhaustion of pressure fluid to and from said actuator, a pair of safety valves connected between said main valve and said actuator, a deflectable member on the leading side of said carriage as it retracts, and means for closing said safety valves in response to deflection of said member to thus trap fluid in the actuator and stop carriage retraction.

10. In web splicing apparatus, the combination of a paster carriage movable between retracted and operative positions, a predrive carriage movable between retracted and operative positions, first and second power means respectively for moving said paster and predrive carriages between their positions, a push button switch and means responsive to closure thereof for energizing said first power means to move said paster carriage towards its operative position, means responsive to opening of said push button switch to cause said first power means to retract said paster carriage, a first limit switch actuated as said paster carriage leaves its retracted position and operatively connected to energize upon such actuation said second power means and move said predrive carriage toward its operative position, means responsive to subsequent de-actuation of said first limit switch to de-energize said second power means and retract said predrive carriage, a second limit switch actuated as said paster carriage reaches its operative position, and means connecting said second limit switch to said first power means to maintain the latter energized despite opening of said push button switch, whereby release and opening of said push button switch before said paster carriage reaches its operative position causes automatic retraction of both said carriages.

11. In a web splicing apparatus, the combination of a paster carriage movable between retracted and operative positions, a predrive carriage movable between retracted and operative positions, first and second power means respectively for moving said paster and predrive carriages between their positions, a push button switch and means responsive to closure thereof for energizing said first power means to move said paster carriage toward its operative position, means responsive to opening of said push button switch to cause said first power means to retract said paster carriage, a first control element and means for actuating it as said paster carriage leaves its retracted position to energize said second power means and move said predrive carriage toward its operative position, means responsive to subsequent de-actuation of said first limit switch to de-energize said second power means and retract said predrive carriage, a second control element and means for actuating it as said paster carriage reaches its operative position, and means connecting said second control element to said first power means to maintain the latter energized when said switch is released, whereby release and opening of said switch before said paster carriage reaches its operative position causes automatic retraction of both said carriages.

12. In apparatus for splicing a running web to a new web roll, the combination comprising a paster carriage movable between retracted and operative positions, a fluid pressure actuator for moving said carriage between its two positions, a two-position solenoid valve for controlling said actuator, a push button switch, control means for energizing said solenoid valve to initiate movement of said carriage toward its operative position when said push button switch is closed, said control means de-energizing said solenoid valve upon opening of said push button switch to retract said carriage, a limit switch actuated only when said carriage is substantially in its operative position, and means connecting said limit switch when actuated to said solenoid valve to maintain the latter energized despite opening of said push button switch, whereby release of said push button switch before said limit switch is actuated automatically causes said carriage to retract.

13. In apparatus for splicing a running web to a new roll, the combination comprising a paster carriage movable between a retracted position and an operative position adjacent the running web, power means for moving said carriage between its positions, a position switch, means responsive to closure of said position switch for initiating movement of the carriage toward its operative position, a limit switch actuated only when the carriage substantially reaches its operative position, and control means for causing said carriage to automatically retract if said position switch is opened before said limit switch is actuated.

14. In apparatus for splicing a running web drawn from an expiring roll to a new web roll, the combination comprising a rotatable reel for rotatably supporting the expiring and the new rolls, a motor drivingly connected to rotate said reel, means including a photoelectric relay for automatically stopping said reel when the new roll is brought into predetermined proximity with the running web, a paster carriage pivotably between a retracted position and a position adjacent the opposite side of the web, means responsive to actuation of said photoelectric relay for moving said paster carriage from its retracted position, a predrive carriage movable between a retracted position and an operative position in driving engagement with the new roll, means responsive to movement of said paster carriage from its retracted position for moving said predrive carriage toward its operative position, whereby said carriages cannot be caught by rolls on the reel.

15. In apparatus for splicing a running web drawn from an expiring roll to a new web roll, the combination comprising a rotatable reel for rotatably supporting the expiring and the new rolls, means for rotating said reel, positioning means for automatically stopping said reel when the new roll is brought into predetermined proximity with the running web, a paster carriage pivotable between a retracted position and a position adjacent the opposite side of the web, means for moving said paster carriage from its retracted position only after said positioning means are actuated, a predrive carriage movable between a retracted position and an operative position in driving engagement with the new roll, means for moving said predrive carriage from its retracted position only after said paster carriage has left its retracted position, whereby rotation of said reel cannot cause the rolls to strike either of said carriages.

References Cited in the file of this patent

UNITED STATES PATENTS

| | | |
|---|---|---|
| 2,147,617 | McCleery | Feb. 14, 1939 |
| 2,203,607 | Wood | June 4, 1940 |
| 2,689,095 | McWhorter | Sept. 14, 1954 |